US 8,522,038 B2

(12) United States Patent
Lu et al.

(10) Patent No.: US 8,522,038 B2
(45) Date of Patent: Aug. 27, 2013

(54) METHOD FOR PREVENTING UNAUTHORIZED ACCESS TO THE COMPUTER SYSTEM BY USING ONE-TIME PASSWORD

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 964 days.

(21) Appl. No.: 11/649,564

(22) Filed: Jan. 4, 2007

(65) Prior Publication Data

US 2007/0245150 A1 Oct. 18, 2007

(30) Foreign Application Priority Data

Apr. 11, 2006 (CN) .......................... 2006 1 0072785

(51) Int. Cl.
*H04L 29/00* (2006.01)
(52) U.S. Cl.
USPC .............. 713/184; 713/182; 713/183; 726/20
(58) Field of Classification Search
USPC ............................ 713/182, 183, 184; 726/20
See application file for complete search history.

(56) References Cited

U.S. PATENT DOCUMENTS

| 5,592,553 | A | * | 1/1997 | Guski et al. ................... 713/159 |
| 7,171,564 | B2 | * | 1/2007 | Kelley et al. .................. 713/183 |
| 2002/0177433 | A1 | | 11/2002 | Bravo et al. |
| 2003/0012382 | A1 | * | 1/2003 | Ferchichi et al. ............. 380/270 |
| 2003/0033226 | A1 | * | 2/2003 | Anderson ....................... 705/32 |
| 2005/0177750 | A1 | * | 8/2005 | Gasparini et al. ............. 713/201 |
| 2006/0080545 | A1 | * | 4/2006 | Bagley .......................... 713/183 |
| 2006/0242698 | A1 | * | 10/2006 | Inskeep et al. .................. 726/20 |

* cited by examiner

*Primary Examiner* — Jeffrey Pwu
*Assistant Examiner* — Michael D Anderson
(74) *Attorney, Agent, or Firm* — Hammer & Associates, P.C.

(57) ABSTRACT

The present invention provides a method for preventing unauthorized access to the computer system, and more particularly, provides a method for preventing unauthorized access to the computer system by using the one-time password. The one-time password is produced by a one-time password generator, and decrypted and verified by the computer logon system, and is used to log on the computer system. The present invention increases the security of the computer system, and protects the computer system from unauthorized access and use in a cost-effective way.

4 Claims, 3 Drawing Sheets

METHOD FOR PREVENTING UNAUTHORIZED ACCESS TO THE COMPUTER SYSTEM BY USING ONE-TIME PASSWORD

FIELD OF THE INVENTION

The present invention relates to a method for preventing unauthorized access to the computer system, and more particularly, to a method for preventing unauthorized access to the computer system by using one-time password.

BACKGROUND OF THE INVENTION

In recent years, with dramatic advances in information technologies, the computer is involved in daily life, working, and learning as a useful tool consequentially. However, sometimes the computer is accessed by malicious people through unauthorized means, which may cause incalculable loss. Preventing unauthorized access to the computer system becomes an important problem on computer information security.

To resolve this problem, a user name and password combination is often used to protect the computer system from being intruded by unauthorized users. But the password assigned by users tends to be too simple, and can be cracked easily. Once it is figured out by malicious people, the password protection will lose its effect.

The two-factor authentication that uses the hardware, such as an identity authentication key or a smart card, in combination with a password or biometrics for higher security is also applied in logging on the computer system. Obviously, the security is increased in this way. When a user is to log on the system, a hardware device that has been registered with this computer is required, as well as the user name and password combination.

The unauthorized users who can crack the password of a valid user are blocked in this way.

The above two methods are intended for the normal situation. However, the hardware device of the two-factor authentication does not work under Windows safe mode, because its driver cannot be found under this mode. The malicious people may seize this vulnerability to log on the system to get the confidential information. Moreover, the hardware device is possibly not cost-effective for most of the ordinary users.

SUMMARY OF THE INVENTION

The present invention overcomes the above defects of existing protection methods, and provides a method for preventing unauthorized access to the computer system by using one-time password, which can be used to protect the computer system in a reliable and effective way.

The technical solution of the method of the present invention is:

A method for preventing unauthorized access to the computer system by using one-time password, i.e. a user who is to log on the computer system must enter a one-time password, which is produced by a one-time password generator; the one-time password generator comprises a random number generation unit, a compression unit, and an encryption unit; and a user number (UN) or system number (SN), valid start date (D), valid start time (T), and/or valid use duration ($T_0$) entered by the user, along with a random number (R) produced by the random number generation unit are compressed with the compression unit and encrypted with the encryption unit to create the cipher text to gain a one-time password (OTP).

The computer logon system comprises a registration module, a decryption module, a verification module, and a monitoring module; the registration module is used to write the parameter information of the application of the computer logon system of the present invention to the registry; the decryption module is used to decrypt the entered one-time password to the plain text; the verification module is used to verify if the plain text matches with a value in the password database; and the monitoring module is used to monitor the valid period of the usage of the one-time password.

Once the one-time password has been entered into the computer logon system, the decryption module will decrypt and decompress it to generate the original UN or SN, valid start date (D), valid start time (T), and/or valid use duration ($T_0$). The verification module will then verify if the information is proper. After the user has logged on the system successfully, the monitoring module will monitor the use period of the password.

For the instance of registering with the SN, the logon system will first invoke the native database to verify if the one-time password has ever been used before. After a successful logon, the one-time password will be encrypted and saved to the system database by the logon system.

Usage of the one-time password involved in the present invention is restricted to valid duration or counts, that is to say, even if malicious people gain the password, they can hardly use it to log on the computer system. This method is a complement to the existing protection system which now cannot protect the computer system under Windows safe mode. Using the one-time password is a reliable and cost-effective way to protect the computer system.

BRIEF DESCRIPTION OF THE DRAWINGS

The present invention may be further understood from the following description in conjunction with the appended drawings. In the drawings.

DETAILED DESCRIPTION OF THE EMBODIMENTS

The preferred embodiments are provided with the appended drawings.

The First Embodiment

The first embodiment makes use of the duration as a limit condition to implement the present invention.

Figure 1:
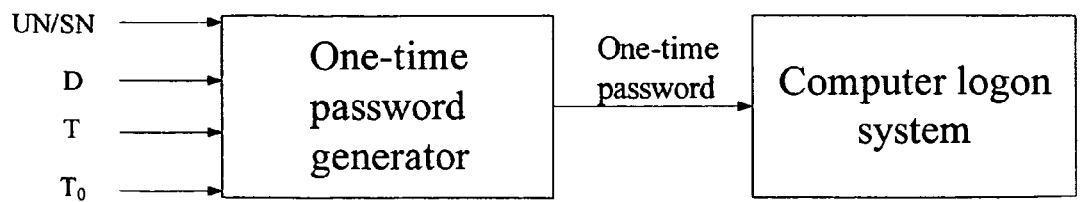
FIG. 1 is a principle diagram of the present invention.
Figure 2:
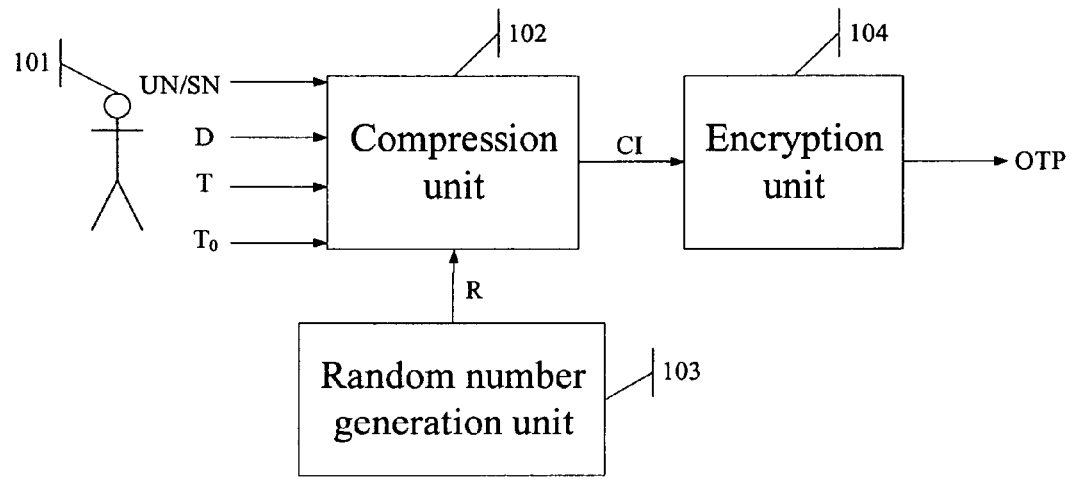
FIG. 2 is a working principle diagram of the one-time password generator of the present invention.

If a user is logging on the computer system, the user must use a one-time password generated by the one-time password generator. The generator is installed on a computer that is administrated by the administrator. The user needs to provide user information to the administrator, and the administrator uses the one-time password generator with the information to produce the one-time password. Referring to FIG. 2, this is the working principle diagram of the one-time password generator. The one-time password generator will prompt the user to input the following information:

1) Unique User Number (UN), which can be assigned to the user by software distributor, or can be assigned to each employee by the administrator of intranet;
2) Valid Start Date (D), which is defaulted to the current date or can be customized, and indicates the valid date when the one-time logon password takes effect;
3) Valid Start Time (T), which is defaulted to the current time or can be customized, and indicates the valid time when the one-time logon password takes effect;
4) Valid Use Duration ($T_0$), which is a number of hours, and indicates the length of the period from the time the user uses the one-time password to log on the computer system until the time the password is invalidated.

First, the random number generation unit 103 generates a random number (R), then the compression unit 102 compresses the user number (UN), valid start date (D), valid start time (T), and/or valid use duration ($T_0$) entered by the user 101, along with the random number. The compressed information (CI) is encrypted by the encryption unit 104 using a certain encryption algorithm to produce a one-time password (OTP), where the encryption algorithm used by encryption unit 104 is a publicly known symmetric-key encryption algorithm, such as DES. The one-time password has higher security strength, and it is a very random character string and is hard to crack, because it is generated from a unique user number, valid start date, valid start time, and/or valid use duration plus a random number. In addition, if the user 101 has registered the UN with the logon protection system on more than one computer, the user 101 can use the one-time password to log on these computers within its period of validity. So it is very convenient for the user to use.

Figure 3:
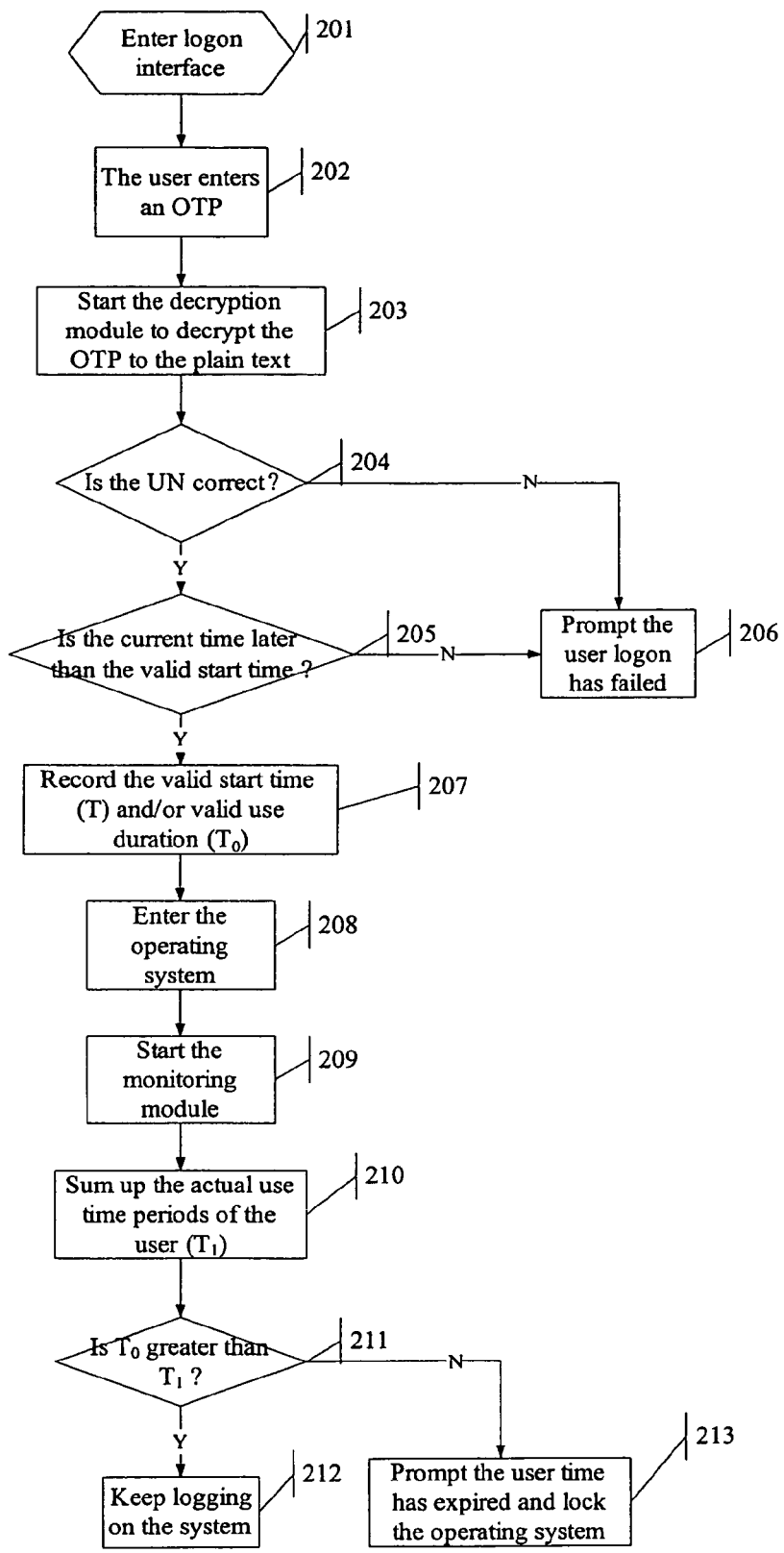
FIG. 3 is a workflow diagram of logging on the computer system by using the one-time password with limitation of the duration of the present invention.

Once a user has obtained a one-time password, the user can use it on the computer where he has registered his UN. Referring to FIG. 3, this is the workflow of the foregoing preferred embodiment. First, enter the logon interface, as shown in Step 201. When prompted, the user enters the one-time password derived from the one-time password generator, as shown in Step 202. The system starts the decryption module to decrypt the one-time password, as shown in Step 203. The decryption module will first decrypt the password with the same key as used by the one-time password generator, and then decompress it to gain the same information as the user entered in the one-time password generator, such as the user number (UN), valid start date (D), valid start time (T), and/or valid use duration ($T_0$). Subsequently, the verification module verifies if the one-time password is valid. The verification module first verifies if the UN is the same as the registered UN, as shown in Step 204. If not, the user will be prompted that the logon has failed, as shown in Step 206. Otherwise, the system will go to judge if the current time is later than the valid start time, as shown in Step 205. If not, the user will also be prompted that the logon has failed, as shown in Step 206. Otherwise, the system will record the valid start time (T) and valid use duration ($T_0$), as shown in Step 207. Next, the user will enter the operating system, as shown in Step 208. The monitoring module then starts up to monitor if the time accumulation the user operates with the one-time password has exceed the range of valid use duration, as shown in Step 209. The user actual use time ($T_1$) is calculated by summing up the periods of time during which the user has logged on the computer system with the one-time password, as shown in Step 210. Thereby, the system can judge if the valid use duration ($T_0$) is greater than the actual use time ($T_1$), as shown in Step 211. If yes, the user can keep logging on the computer system, as shown in Step 212. Otherwise, the system will prompt the user that the valid use duration has expired and lock the operating system immediately, as shown in Step 213.

The Second Embodiment

The second embodiment makes use of the counts of usage as a limit condition to implement the present invention.

Like the previous embodiment, the user first must request a one-time password produced by the one-time password generator from the administrator. Referring to FIG. 2, this is the working principle diagram of the one-time password generator. The one-time password generator will prompt the user to input the following information:
1) Unique System Number (SN), which is entered when installing the logon protection system of the present invention;
2) Valid Start Date (D), which is defaulted to the current date or can be customized, and indicates the valid date when the one-time logon password takes effect;
3) Valid Start Time (T), which is defaulted to the current time or can be customized, and indicates the valid time when the one-time logon password takes effect;
4) Valid Use Duration ($T_0$), which is a number of hours, and indicates the length of the period from the time the user uses the one-time password to log on the computer system until the time the password is invalidated.

After the user has entered the required information, and the random number generation unit 103 has produced a random number (R), the compression unit 102 will compress the SN, valid start date (D), valid start time (T) and/or valid use duration ($T_0$), along with the random number (R). The encryption unit 104 then will encrypt the compressed information to the cipher text, which is the one-time password (OTP). This one-time password is derived from the SN and is applicable to the only computer with the SN, because the SN is unique in general.

Figure 4:
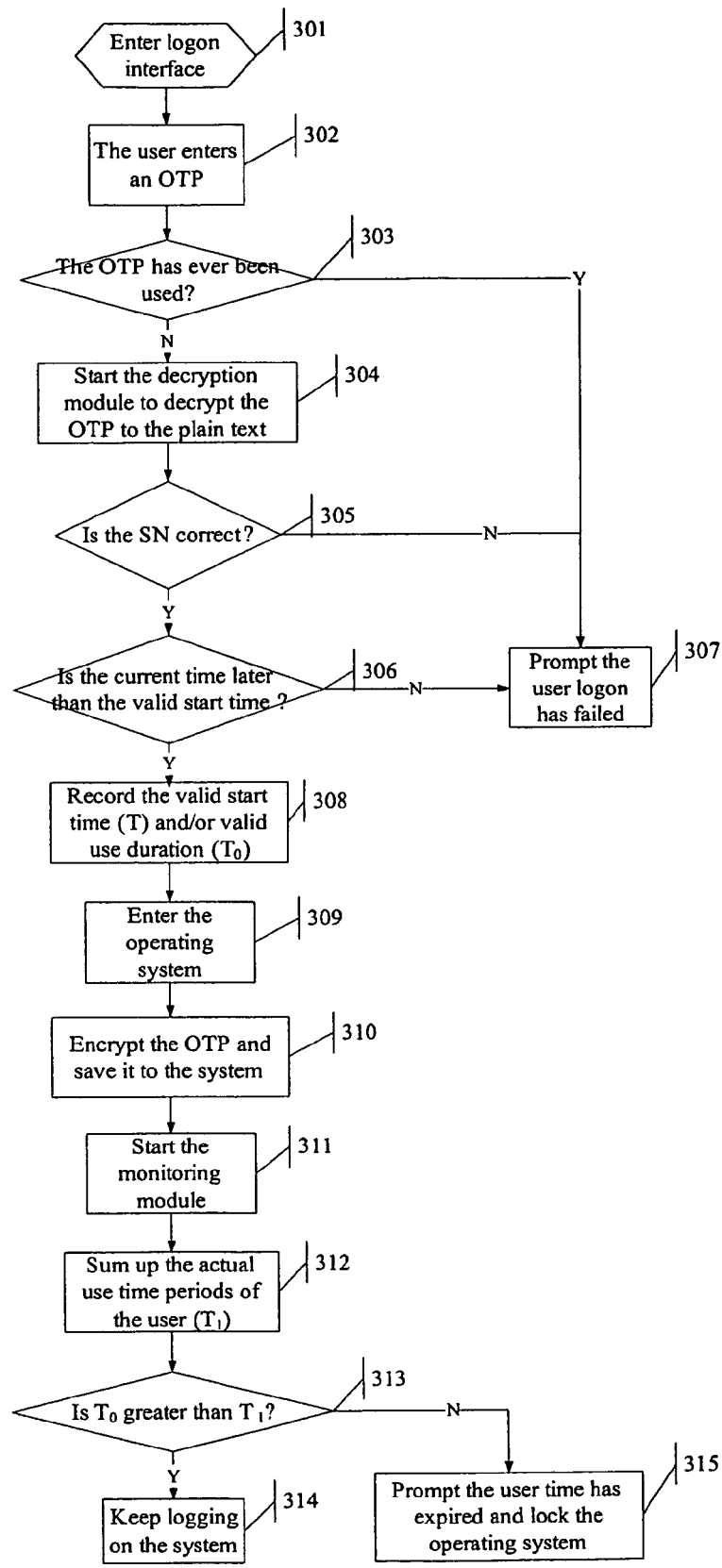
FIG. 4 is a workflow diagram of logging on the computer system by using the one-time password with limitation of the counts of the present invention.

Once a user has obtained a one-time password, the user can use it on the appropriate computer. Referring to FIG. 4, this is the workflow of the foregoing preferred embodiment. First, enter the logon interface, as shown in Step 301. When prompted, the user enters the one-time password derived from the one-time password generator, as shown in Step 302. The system invokes the native system database to verify if the one-time password has ever been used before, as shown in Step 303. If yes, the user will be prompted that the logon has failed, as shown in Step 307. Otherwise, the decryption module will start up to decrypt the one-time password, as shown in Step 304. The decryption module will first decrypt the one-time password with the same key as used in the one-time password generator, and then decompress it to gain the same information as the user entered in the one-time password generator, such as the SN, valid start date (D), valid start time (T) and/or valid use duration ($T_0$). Subsequently, the verification module verifies if the one-time password is valid. As shown in Step 305, the verification module verifies if the decrypted SN is the same as the registered SN. If not, the user will also be prompted that the logon has failed, as shown in Step 307. Otherwise, the system will verify if the current time is later than the valid start time (T), as shown in Step 306. If not, the system will also prompt the user that the logon has failed, as shown in Step 307. Otherwise, the system will record the valid start time (T) and/or valid use duration ($T_0$), as shown in Step 308. Next, the user will enter the operating system, as shown in Step 309. Then the one-time password will be encrypted and saved to the system database, as shown in Step 310. The monitoring module then starts up to monitor if the time accumulation the user operates with the one-time password has exceeded the range of valid use duration, as shown in Step 311. The user actual use time ($T_1$) is calculated by summing up the periods of time during which the user has logged on the computer system with the one-time password, as shown in Step 312. Thereby, the system can judge if the length of the valid use duration ($T_0$) is greater than the actual use time ($T_1$), as shown in Step 313. If yes, the user can keep logging on the computer system, as shown in Step 314. Otherwise, the system will prompt the user that the valid use duration has expired and lock the operating system immediately, as shown in Step 315.

The invention claimed is:

1. A method for preventing unauthorized access to a computer system by using an one-time password comprising steps of:
    inputting an unique user identifier, a valid start time which indicates a valid time when the one-time password takes effect and a valid use duration which indicates a length of a period from using of the password to log on until expiration of the password to a password generator;
    generating a random number by a random number generation unit;
    compressing the user identifier, the valid start time, the valid use duration and the random number by a compression unit;
    encrypting the compressed result of the compression unit to produce an one-time password;
    entering the one-time password to a computer logon system in the computer system by a user;
    decrypting the one-time password by a decryption unit;
    decompressing the result of the decryption unit to get the user identifier, the valid start time and the valid use duration;
    verifying if the one-time password is valid by comparing the user identifier to the registered identifier, verifying if current time is later than the valid start time, and monitoring if time accumulation user operates with the one-time password has exceeded range of the valid use duration;
    prompting the user that the logon has failed and locking the computer system if the user identifier is not the same as the registered user identifier in the computer system;
    prompting the user that the logon has failed and locking the computer system if current time is later than the valid start time;
    recording the valid start time and valid use duration if the current time is not later than the valid start time;
    entering the computer system by the user;
    summing up periods of time during which the user has logged on the computer system with the one-time password to get an actual use time;
    prompting the user that the valid use duration has expired and locking the computer system if the valid use duration is smaller than the actual use time.

2. The method according to claim 1, wherein the user identifier is an user number or a system number.

3. The method according to claim 2 wherein when the user identifier is the user number, the step of verifying if the one-time password is valid comprises:
    verifying if the user number is the same as a registered user number;
    if not, prompting the user of a logon failure;
    otherwise, determining if current time is later than the valid start time;
    if so, the one-time password being determined to be valid;
    otherwise, the one-time password being determined to be not valid.

4. The method according to claim 2 wherein when the user identifier is the system number, the step of verifying if the one-time password is valid comprises:
    verifying if the decrypted system number is the same as a registered system number;
    if not, prompting the user of a logon failure;
    otherwise, determining if current time is later than the valid start time;
    if so, the one-time password being determined to be valid;
    otherwise, the one-time password being determined to be not valid.

* * * * *